United States Patent [19]

Berns

[11] Patent Number: 5,228,371

[45] Date of Patent: Jul. 20, 1993

[54] BAR FEEDING MACHINE FOR A LATHE

[76] Inventor: Joseph F. Berns, 1171 Georgia La., Cincinnati, Ohio 45215

[21] Appl. No.: 141,697

[22] Filed: Jan. 7, 1988

[51] Int. Cl.⁵ .................... B23B 13/02; B23B 23/02
[52] U.S. Cl. ........................................ 82/127; 82/170; 414/17
[58] Field of Search ............... 82/2.5, 2.7, 2 R, 28 R, 82/38 R, 38 A, 38 B, 1 C; 414/17

[56] References Cited

U.S. PATENT DOCUMENTS

| | | | |
|---|---|---|---|
| 2,892,243 | 6/1959 | Lanphere et al. | 414/17 |
| 4,217,800 | 8/1980 | Furegati | 82/2.5 |
| 4,407,176 | 10/1983 | Link | 82/2.5 |
| 4,421,426 | 12/1983 | Leon et al. | 414/17 |

*Primary Examiner*—William E. Terrell
*Attorney, Agent, or Firm*—Wood, Herron & Evans

[57] ABSTRACT

A bar feeding and handling machine. A frame bar is mounted in parallelism with the axis of a machine chuck. The chuck is adapted to support a workpiece. Link members are pivotally attached to the frame bar adjacent to opposite ends thereof. A pneumatic cylinder is pivotally attached to the link members to move between an advanced position aligned with the machine chuck and a retracted position. A pusher head mounted on a cylinder rod of the cylinder can engage the workpiece when in advanced position. The cylinder rod and the head are advanced to advance the workpiece. Another workpiece can be loaded into the chuck when the cylinder is in retracted position.

7 Claims, 5 Drawing Sheets

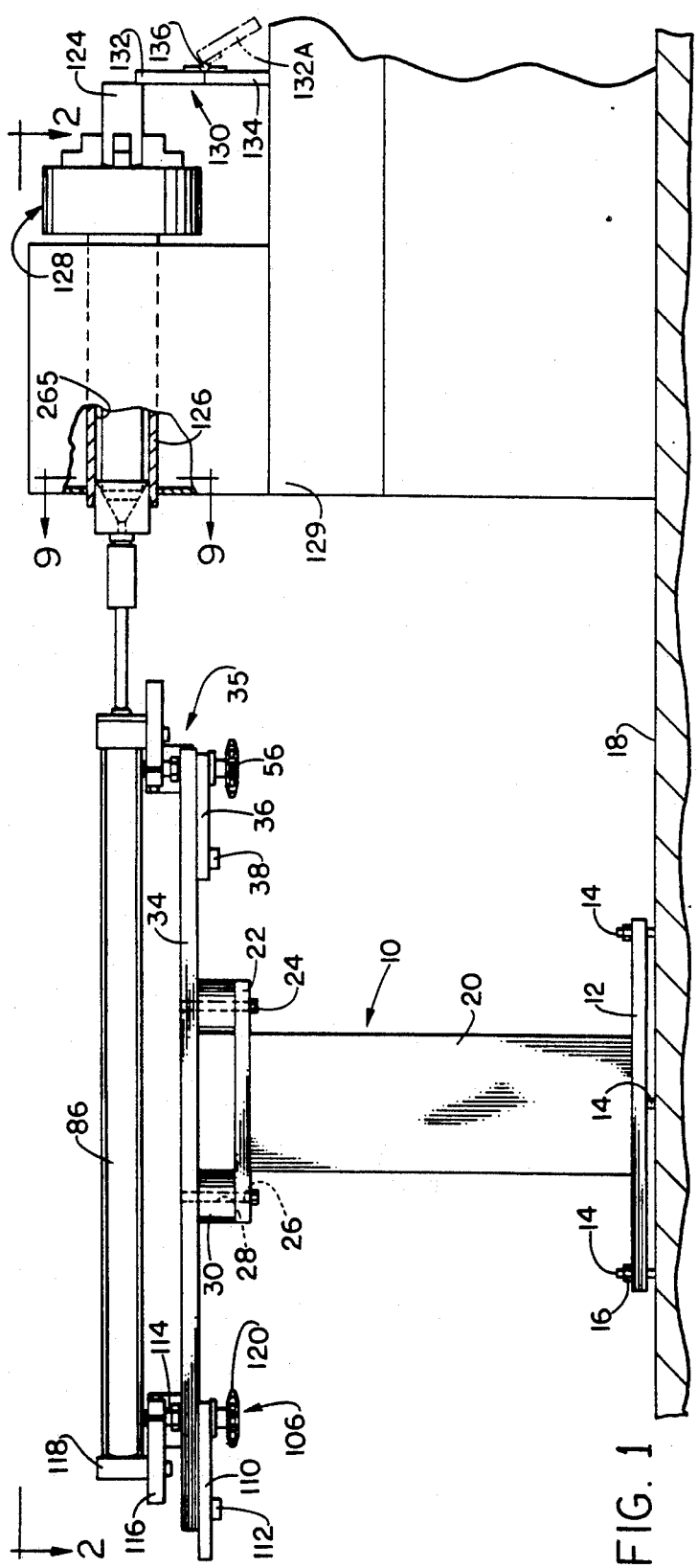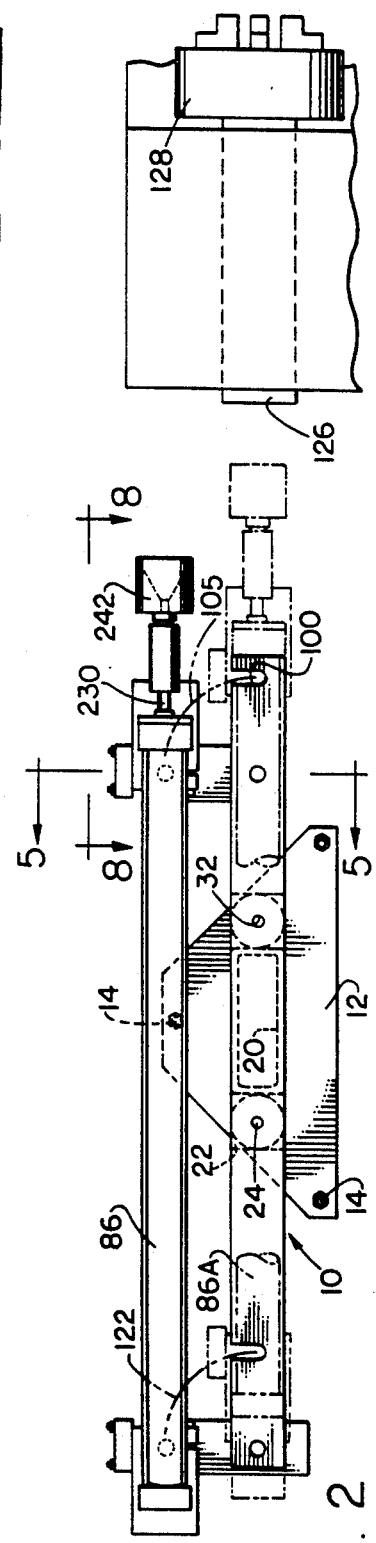
FIG. 1
FIG. 2

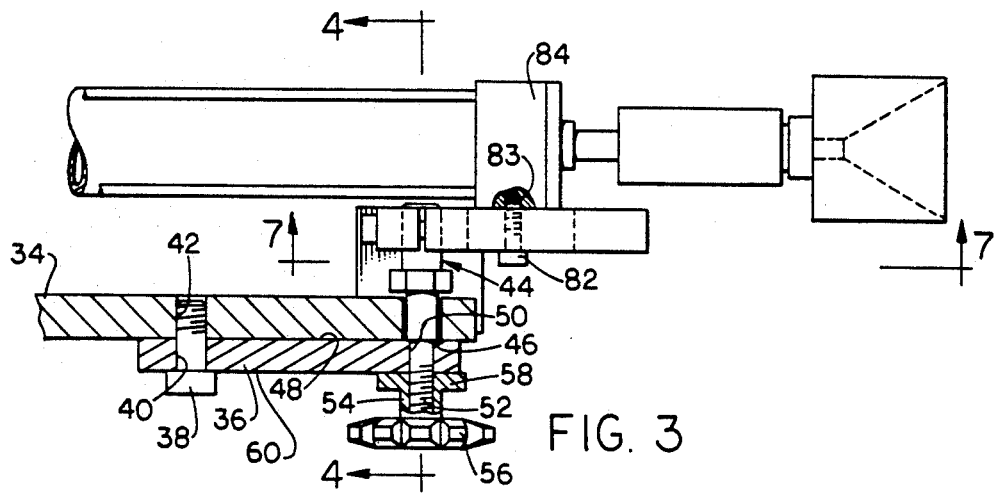
FIG. 3
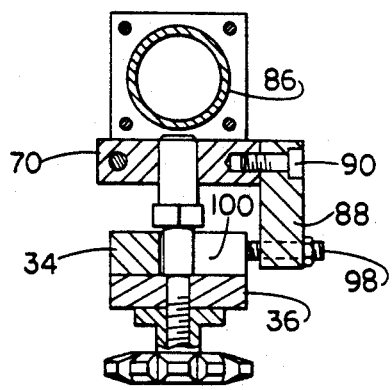
FIG. 4
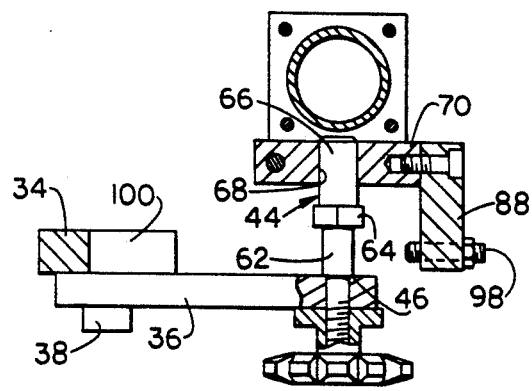
FIG. 5
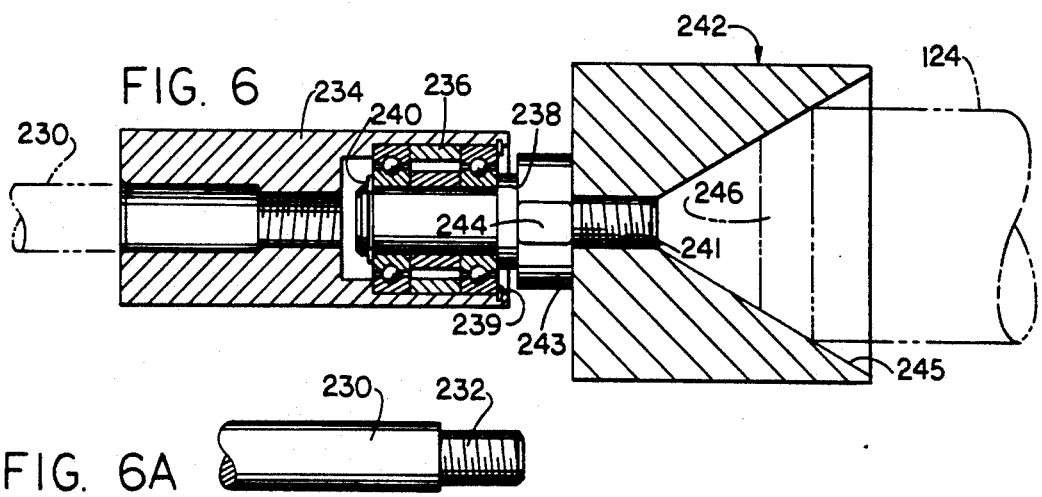
FIG. 6
FIG. 6A

BAR FEEDING MACHINE FOR A LATHE

BACKGROUND OF THE INVENTION

This invention relates to bar feeding and handling machines. More particularly, this invention relates to a machine for feeding a bar-shaped workpiece through a chuck of a machine such as a lathe.

An object of this invention is to provide a bar-feeding machine which urges the workpiece through the lathe chuck and into engagement with a stop.

A further object of this invention is to provide such a bar feeding machine in which the bar is advanced by action of a pneumatic cylinder.

A further object of this invention is to provide such a machine in which the pneumatic cylinder and a bar engaging head are swung out of alignment with the lathe chuck while a workpiece is being loaded into the lathe chuck.

A bar feeding machine is shown in Applicant's U.S. Pat. No. 4,621,550. Bar feeding machines are shown in U.S. Pat. Nos. Mason 4,406,190, Parson et al. 3,927,583, and Lohner 4,034,632. German patent No. 1,056,451 of Hofmann, dated Apr. 1959, also shows a bar feeding machine. However, the machines of these patents do not work like the present bar feeding machine and do not show a retractable drive as shown in the present bar feeding machine.

BRIEF DESCRIPTION OF THE INVENTION

Briefly, this invention provides a bar feeding machine which includes a pneumatic cylinder which can be aligned with a workpiece in a lathe chuck so that advance of a piston rod of the cylinder advances a work engaging head to advance the workpiece through the chuck. The cylinder is mounted on a carriage which can be swung to take the cylinder and the workpiece engaging head out of alignment with the lathe chuck so that a new workpiece can be loaded in the lathe chuck.

The above and other objects and features of the invention will be apparent to those skilled in the art to which this invention pertains from the following detailed description and the drawings, in which:

BRIEF DESCRIPTION OF THE DRAWINGS

FIG. 1 is a view in side elevation of a bar feeding machine constructed in accordance with an embodiment of this invention, a fragmentary portion of a lathe and a floor being shown in association therewith, a portion of the lathe and the floor being broken away for clarity, a driving head being in position for advancing a workpiece;

FIG. 2 is a plan view of the machine and the fragmentary portion of the lathe, the machine being shown in retracted position in full lines and in partly advanced position in double dot-dash lines;

FIG. 3 is a view on an enlarged scale, partly in side elevation and partly in upright section, of a right hand portion of the machine and associated parts;

FIG. 4 is a view in section taken on the line 4—4 in FIG. 3, a cylinder of the machine being shown in advanced position;

FIG. 5 is a view in section taken generally on the line 5—5 in FIG. 2 showing the cylinder in retracted position;

FIG. 6 is a view in upright section of a driving head of the machine, a fragmentary portion of a workpiece and a fragmentary portion of a piston rod of the machine being shown in double dot-dash lines;

FIG. 6A is a fragmentary view in side elevation showing a portion of the piston rod;

In the following detailed description and the drawings, like reference characters indicate like parts.

DESCRIPTION OF PRESENTLY PREFERRED EMBODIMENT OF THE INVENTION

Figure 7:
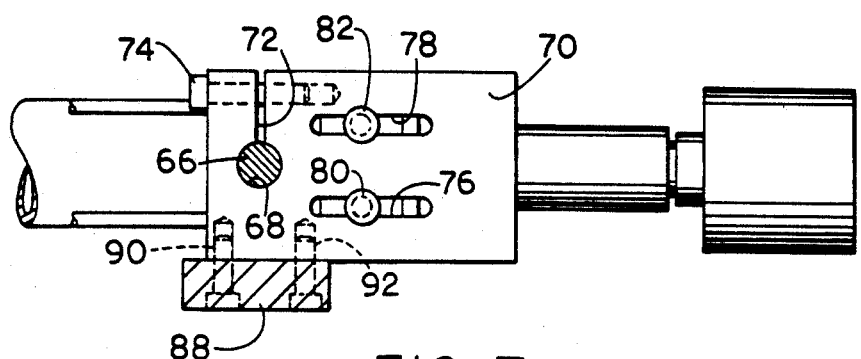
FIG. 7 is a view in section taken on the line 7—7 in FIG. 3.
Figure 8:
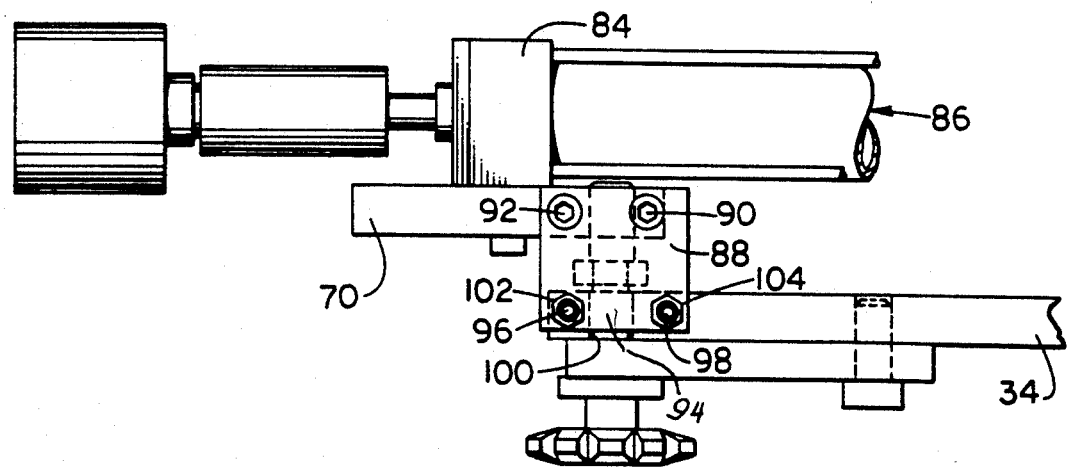
FIG. 8 is a view in section taken on the line 8—8 in FIG. 2.

In FIG. 1 is shown a workpiece feeding machine 10 which is constructed in accordance with an embodiment of this invention. The machine 10 includes a base plate 12. The base plate 12 is supported by three adjustment screws 14 which are threaded in the base plate 12. The adjustment screws can be locked in position by lock nuts 16 threaded thereon. The adjustment screws 14 rest on a floor 18. A hollow post member 20 mounted on the base plate 12 supports a horizontal plate 22. Bolt fasteners 24 extend through clear holes 26 in the horizontal plate 22 and clear holes 28 in shim members 30 to be received in threaded openings 32 in an elongated horizontal frame bar 34. The frame bar 34 is firmly supported in horizontal position.

Near the right hand end of the frame bar 34 is mounted a right hand support assembly 35. The right hand support assembly includes a pivot arm or link member 36, which is swingably mounted on the frame bar 34 by means of a bolt 38 (FIG. 3). The bolt 38 passes through a clear hole 40 in the pivot arm 36 and is threaded in an opening 42 in the frame bar 34. An upright post member 44 is supported on the pivot arm 36. A shoulder 46 on the post member 44 rests on an upper face 48 of the pivot arm 36 at an upright opening 50 in the pivot arm 36. The post member 44 is swingable in the opening 50. A lower end portion 52 of the post member 44 is threaded to receive a tubular internally threaded shaft portion 54 of a locking wheel or nut member 56. The locking wheel 56 can be turned to cause a flange 58 of the locking wheel 56 to engage a lower face 60 of the pivot arm 36 to lock the post member 44 to the pivot arm 36.

Above the shoulder 46 is a cylindrical body portion 62 of the post member 44. A collar portion 64 of the post member 44 separates the cylindrical body portion 62 from an upper cylindrical portion 66. The collar portion 64 is hexagonal to receive a wrench (not shown) for manipulating the post member 44. The upper cylindrical portion 66 of the post member 44 is received in an upright bore 68 (FIG. 7) in a bracket 70. A slot 72 in the bracket 70 permits a bolt 74 to be tightened to cause the bracket 70 to grip the upper cylindrical portion 66 of the post member 44. Slots 76 and 78 in the bracket 70 receive screw fasteners 80 and 82, respectively. The screw fasteners 80 and 82 are threaded in bores 83 (only one of which is shown, FIG. 3) in an end cap 84 of a pneumatic cylinder 86. A stop member 88 is mounted on the bracket 70 by means of screw fasteners 90 and 92. A lower portion 94 of the stop member 88 extends downwardly into alignment with the frame bar 34. Stop screw members 96 and 98 carried by the stop member 88 can engage the frame bar 34 on opposite sides of a slot 100 in the frame bar 34 when the cylinder 86 is in advanced position, as shown in FIG. 4. When the cylinder 86 is in advanced position, the body portion 62 of the post member 44 is received in the slot 100 and the cylinder is aligned with the frame bar 34 as shown in FIG. 2 at 86A in dot-dash lines. The cylinder 86 can be swung to a retracted position shown in FIG. 5 and in full lines in FIG. 2 at 86 at which the stop screw members 96 and 98 are spaced from the frame bar 34. Stop nuts 102 and 104 on the stop screws 96 and 98, respectively, hold the stop screws 96 and 98 in position. The path of the centerline of the post 44 is indicated by an arcuate dot-dash line 105 in FIG. 2.

A left hand support assembly 106 is mounted on the frame bar 34 near the left hand end thereof. The left hand support assembly 106 is similar in construction to the right hand support assembly 35 already described, and the left hand support assembly 106 will not be described in detail. The left hand support assembly 106 supports the left hand end portion of the pneumatic cylinder 86. The left hand support assembly 106 includes a pivot arm or link member 110 pivotally mounted on the frame bar 34 by means of a bolt 112. An upright post member 114 is pivotally mounted on the pivot arm 110. The post member 114 is firmly attached to a bracket 116. The bracket 116 is firmly attached to a left hand end cap 118 of the pneumatic cylinder 86.

A locking wheel or nut member 120 can be tightened to lock the post member 114 to the pivot arm 110. The path of the centerline of the post member 114, when the locking wheels 56 and 120 are released, is indicated by a dot-dash arcuate line 122. Distances between pivots of the pivot arms 36 and 110 are equal so that the axis of the cylinder 86 is maintained parallel to the axis of the frame bar 34.

Figure 9:
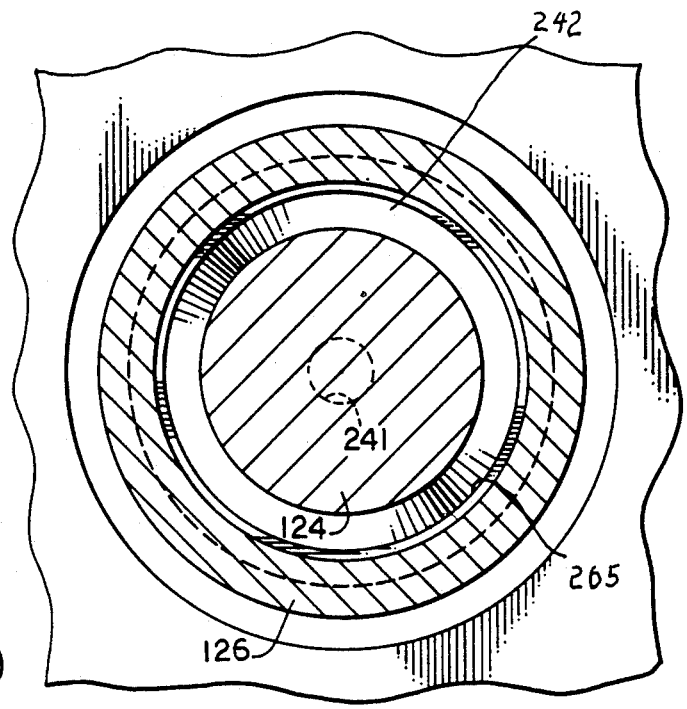
FIG. 9 is a fragmentary view in section taken on an enlarged scale on the line 9—9 in FIG. 1.

When the cylinder 86 is in retracted position, a workpiece 124 can be inserted in a guide tube 126 of a chuck 128. The chuck 128 can be a part of a machine such as a lathe tool or the like 129 (not shown in detail). The workpiece 124 can be advanced until it engages a stop assembly 130, which is mounted on the lathe tool 129. The cylinder 86 is released and swung into the advanced position of FIG. 4. In this position, a cylinder rod 230 (FIGS. 1, 2, 6, and 6A) of the pneumatic cylinder 86 is aligned with the center line of the the chuck 128. The cylinder rod 230 includes a threaded tip 232 on which a bearing mount 234 is supported. The bearing mount 234 supports a bearing assembly 236 which rotatably supports a shaft 238. The bearing mount 234 and the shaft 238 receive snap rings 239 and 240 which hold the bearing assembly 236. The shaft 238 is threaded in a socket 241 in a driving head or block 242. A collar 243 on the shaft 238 is provided with flats 244, only one of which is shown. The block 242 has a generally conic cavity 245, which is aligned with the cylinder rod 230. The workpiece 124 is engaged by the block 242 when the cylinder rod is advanced by action of the pneumatic cylinder 86, and a generally conic section 246 of an end portion of the workpiece 124 is engaged by the wall of the generally conic cavity 245 of the block 242 to cause centering and advance of the workpiece 124. As shown in FIG. 9, the head 242 is cylindrical in shape. The guide tube 126 has a cylindrical opening 265 thereon. The head 242, when advanced into the guide tube 126, has only a small amount of clearance between the outside diameter of the head 242 and the inside diameter of the guide tube 126. The guide tube 126 supports and centers the head 242. The coned head centers and applies pressure to the workpiece 124. This design allows the structure of the bar feeding machine to be of light construction since the workpiece and all the spinning forces are contained inside the lathe.

Figure 10:
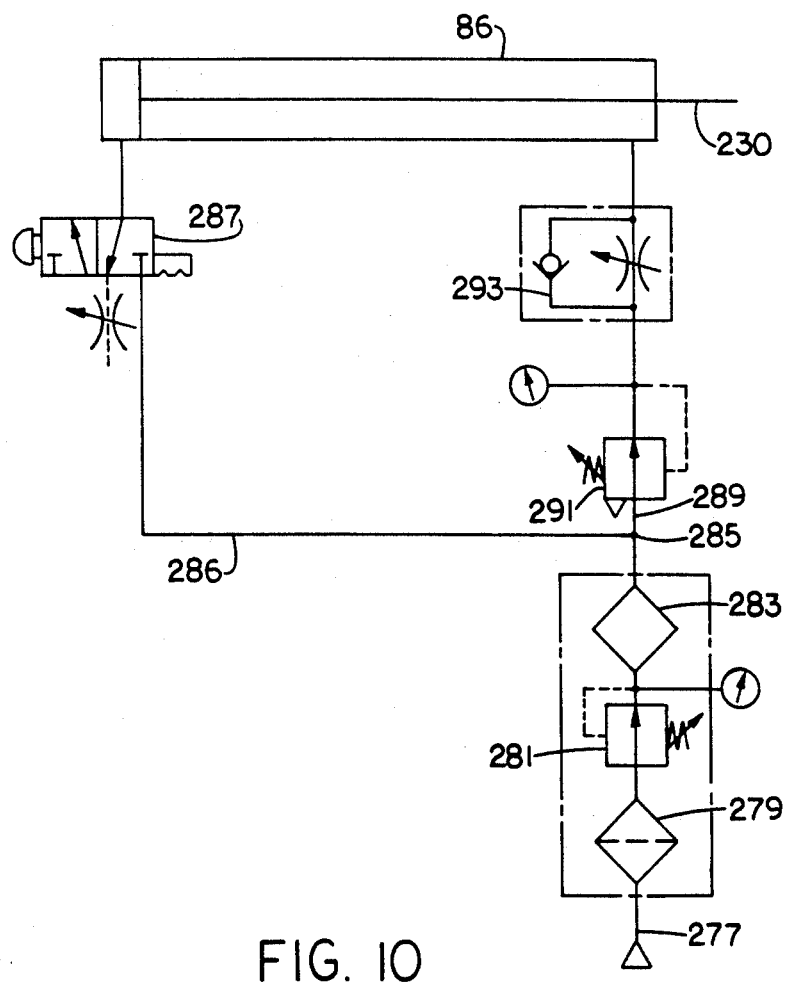
FIG. 10 is a schematic view of pneumatic connections of the machine shown in FIGS. 1-8 inclusive.

Air under pressure can be introduced into the cylinder 86 through appropriate fittings (not shown in detail) to cause advance of the block 242 and the workpiece 124. Details of pneumatic connections are shown in FIG. 10. Air under pressure is introduced through a line 277 and passes through a filter 279, a pressure regulator 281, and a lubricating fitting 283. The pressure regulator 281 can limit the pressure at a branch connection 285 to a suitable pressure, such as 60 pounds per square inch gauge. Compressed air from a left hand branch 286 of the branch connection 285 can be directed to the cylinder 86 through a detent valve 287 to cause extension of the cylinder rod 230 when the valve 287 is in its other position. When the valve 287 is in the position shown, pressure in the left hand end of the cylinder 86 is released. Compressed air from a right hand branch 289 of the branch connection 285 is directed through a pressure regulator assembly 291 and an adjustable throttle valve-check valve assembly 293. The pressure regulator 291 can limit the pressure at the right hand end of the cylinder 86 to a suitable lower pressure, such as 40 pounds per square inch gauge. The adjustable throttle valve-check valve assembly 293 can be adjusted to control the speed of flow of air from the right hand end of the cylinder 86 to control the speed of advance of the cylinder rod 230. The air circuit provides a regulated back pressure on the cylinder while the cylinder is advanced resulting in an even and smooth movement. When the workpiece 124 has been centered and advanced into engagement with the stop assembly 130, jaws of the chuck 128 can be tightened on the workpiece 124. An upper portion 132 of the stop assembly is connected to a bottom portion 134 by a hinge 136, and the upper portion 132 can be lowered to a position 132A in which the stop assembly 130 is free of the workpiece 124. When an operation has been performed on the workpiece 124, the stop assembly 130 can be restored to stop position, the chuck can be released, and the rod 230 and the block 242 can be advanced to advance the workpiece 124 to position for another operation. The bar feed system will feed round, square and hexagonal bars equally well.

Figure 11:
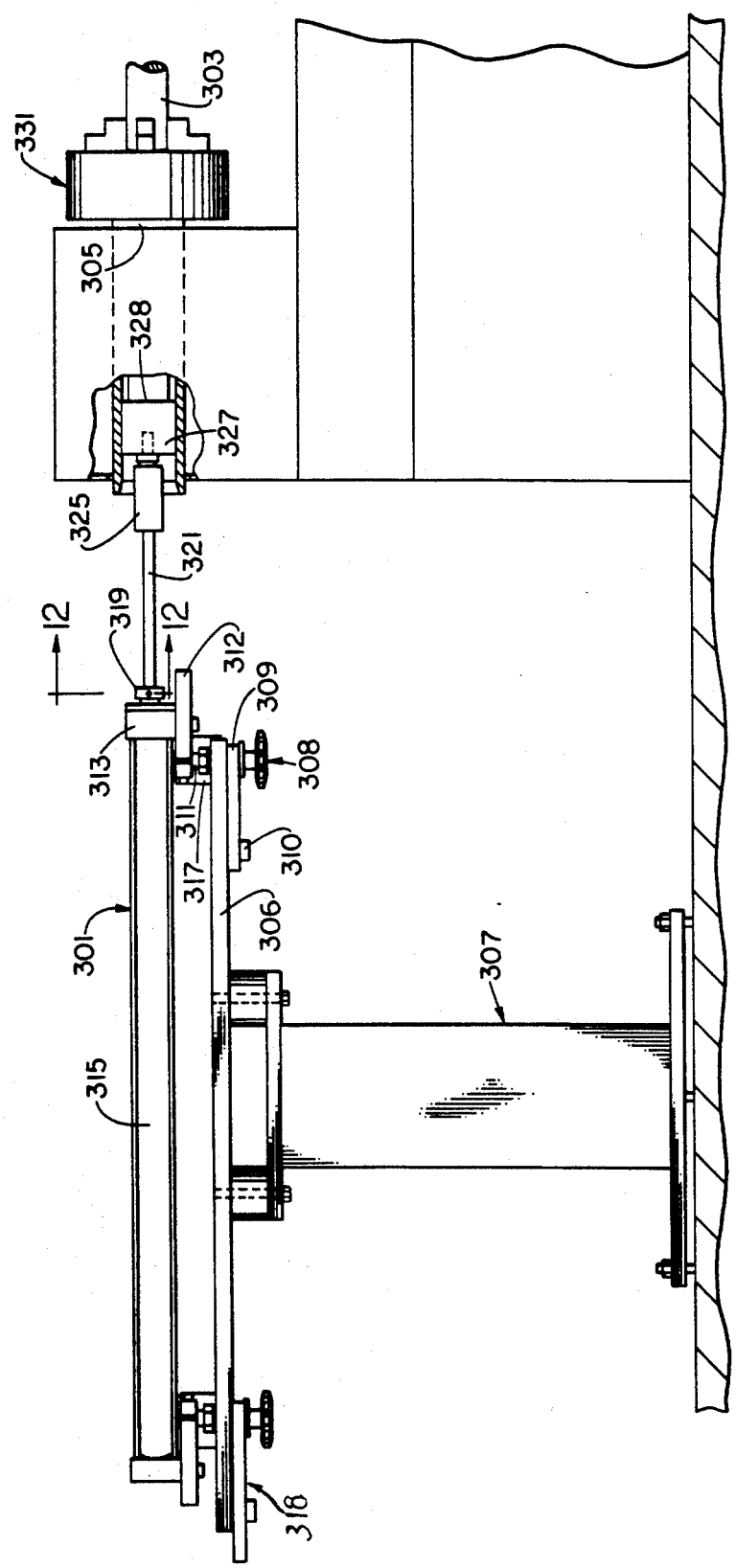
FIG. 11 is a fragmentary view partly in side elevation and partly in upright section of the machine of FIGS. 1-9 inclusive and the lathe revised to act as a part stop for a spindle of the lathe.
Figure 12:
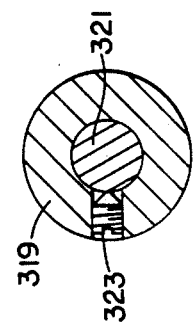
FIG. 12 is a view in section taken on an enlarged scale on the line 12—12 in FIG. 11.

In FIG. 11 is shown a machine 301 of this invention modified to stop a workpiece 303 in a spindle 305. The machine 301 includes an elongated frame bar 306 which is maintained in horizontal elevation position on a stand 307. A right hand support assembly 308 is mounted on a right hand end portion of the elongated horizontal frame bar 306. The right hand support assembly 308 includes a pivot arm 309 pivotally mounted on the frame bar 306 by a bolt 310. An upright post member 311 is rotatably mounted on the pivot arm 309. A bracket 312 is carried by the post member 311 and is attached to an end cap 313 of a pneumatic cylinder 315. A stop member 317 is attached to the bracket 312. A left hand support assembly 318 is supported by a left hand end portion of the elongated horizontal frame bar 306.

The left hand support assembly 318 is substantially a mirror image of the right hand support assembly 308. The structure described to this point in this paragraph can be similar to the structure shown in FIGS. 1, 2, and 3.

A stop collar 319 is mounted on a rod 321 of the cylinder 315 and is held in place thereon by a set screw 323. The rod 321 carries a bearing mount 325 and a head or block 327. The block 327 has a flat upright face 328. Pneumatic connections can be in the position shown in FIG. 10, and the stop collar 319 prevents movement of the rod 321 to the left beyond the position shown in FIG. 11. The workpiece 303 can be introduced through a chuck 331 of the spindle 305 until a left hand end of the workpiece 303 engages firmly against the flat upright face 328 of the head 327 to limit advance of the workpiece 303 to the left. The chuck 331 can be closed on the workpiece 303, and a selected operation can be conducted on the workpiece 303 as to machine the workpiece to a selected length, whereupon, the chuck 331 can be opened to release the machined workpiece, and another workpiece can be inserted and be machined to the exact length as the previous workpiece due to the face 328 remaining in the same position.

The machines for feeding a bar-shaped workpiece and for stopping a part in a spindle, which are illustrated in the drawings and described above, are subject to structural modification without departing from the spirit and scope of the appended claims.

Having described my invention, what I claim as new and desire to secure by Letters Patent is:

1. A bar feeding machine which comprises a frame bar, means for supporting the frame bar in horizontal position adjacent to a machine chuck rotatable about an axis, the machine chuck being adapted to support a workpiece, horizontal link members each having a first end and a second end and pivotally attached at their first respective to the ends frame bar adjacent to opposite end of the frame for, a pneumatic cylinder pivotally attached to the second ends of the link members to move between an advanced position aligned with the axis of the machine chuck and a retracted position generally parallel to and spaced from the axis of the machine chuck, a pusher head mounted on a cylinder rod of the cylinder and cooperatingly engageable with the chuck and the workpiece in the chuck to support the trailing end of the workpiece in centered relation to the chuck axis when in advanced position, and means for advancing the cylinder rod and the head to advance the workpiece, another workpiece being loadable into the chuck when the cylinder is in retracted position.

2. A bar feeding machine which comprises a frame bar, means for supporting the frame bar adjacent to a machine chuck, the chuck being adapted to support a workpiece, horizontal link members each having a first end and a second end and pivotally attached at their first ends to the frame bar adjacent to respective opposite ends of the frame for, a pneumatic cylinder pivotally attached to the second ends of the link members to move between an advanced position aligned with the axis of the machine chuck and a retracted position generally parallel to and spaced from the axis of the machine chuck, a pusher head mounted on a cylinder rod of the cylinder and engageable with the trailing end of the workpiece and the chuck to support the trailing end of the workpiece in centered relation to the chuck axis when in advanced position, and means for advancing the cylinder rod and the head to advance the workpiece while supporting its trailing end in centered relation to the chuck and another workpiece being loadable into the chuck when the cylinder is in retracted position.

3. A bar feeding machine as in claim 2 in which the distances between pivots of the link members are equal.

4. A bar feeding machine as in claim 2 in which there are end caps on the cylinder, a bracket is attached to each end cap, an upright shaft is attached to each bracket, and each upright shaft is rotatably mounted on one of the link members.

5. A bar feeding machine as in claim 4 in which means is provided for locking each upright shaft to the associated link member to hold the pneumatic cylinder in position.

6. A bar feeding machine as in claim 5 in which the means for locking each upright shaft to the associated link member includes a nut member threaded on the upright shaft and bearing on the link member to cause the link member to engage a shoulder on the upright shaft to lock the shaft and the link member together.

7. A bar feeding machine as in claim 1 in which the pusher head cooperates with the guide tube of the chuck and the workpiece in the chuck when supporting the trailing end of the workpiece in centered relation to the chuck axis.

* * * * *

UNITED STATES PATENT AND TRADEMARK OFFICE
CERTIFICATE OF CORRECTION

PATENT NO. : 5,228,371
DATED : July 20, 1993
INVENTOR(S) : Joseph F. Berns

It is certified that error appears in the above-indentified patent and that said Letters Patent is hereby corrected as shown below:

Column 1 Line 24     "Lohner"      should be     --Johnson--

Column 3 Line 52     "the"         should be     deleted

Column 4 Line 57     "elevation"   should be     --elevated--

Column 5 Line 38
    and Line 39      "first respective to the ends frame bar
                      adjacent to opposite end of the frame bar"

should be     --first ends to the frame bar
                                   adjacent to opposite respective
                                   ends of the frame bar--

Column 6 Line 10
    and Line 11      "adjacent to respective opposite ends"

should be --adjacent to opposite respective
                                   ends--

Signed and Sealed this

Twenty-eighth Day of June, 1994

Attest:

BRUCE LEHMAN

*Attesting Officer*     Commissioner of Patents and Trademarks